Aug. 18, 1964   J. A. BALDWIN ETAL   3,145,170
OIL FILTER CARTRIDGES
Filed Jan. 5, 1962
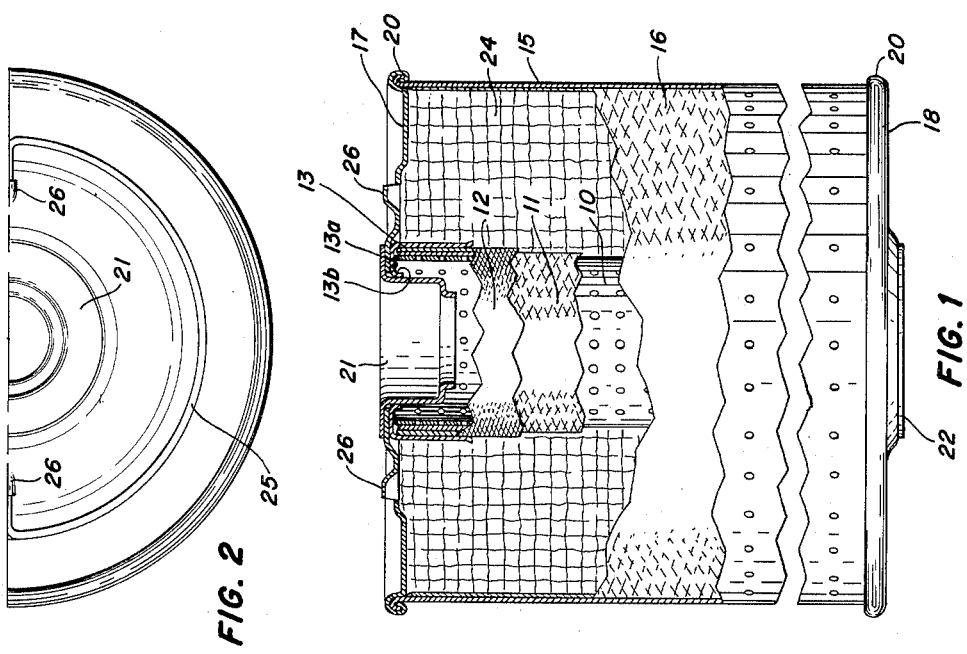
INVENTOR
JESSE A. BALDWIN
ROBERT A. SCHROEDER and
BY    ARNOLD L. ENDER
ATTORNEY

United States Patent Office 3,145,170
Patented Aug. 18, 1964

3,145,170
OIL FILTER CARTRIDGES
Jesse A. Baldwin, Robert A. Schroeder, and Arnold L. Ender, Kearney, Nebr., assignors to J. A. Baldwin Manufacturing Company, Kearney, Nebr., a corporation of Wisconsin
Filed Jan. 5, 1962, Ser. No. 164,449
3 Claims. (Cl. 210—232)

This invention relates to improvements in oil filters and more particularly to an improved filter element or cartridge for use in the filtering of hydrocarbon oils generally but which is especially suited to filtering the oil of the lubrication systems of internal combustion engines, both gas and diesel, of the type employed to power present-day automobiles, trucks, tractors and the like.

Recently, there has come into use a low-cost filtering media capable not only of rendering lubricating oils and other liquids both chemically and visibly clean, but also one which is so constituted and can be prepared in such a way as to make possible the production of highly efficient filter elements therefrom in modern, high-speed automatic or semi-automatic filter element packing equipment. Speaking generally, such new filtering media comprises one of a variety of vegetable fibers in the natural state, preferably short-length cotton linters, to which an inexpensive material or materials such as wood chips, rice hulls and the like may be added, which has been both chemically and mechanically processed so as to impart to said vegetable fibers certain beneficial and highly desirable properties over and above those which they possess in the untreated state, including without limitation the ability to "set up" and thereby resist stratification and settling when compacted under high pressure by the so-called ram-packing technique to the form of a cylindrical filter cartridge.

However, because of the physical nature of this new filtering media and the desirability of producing filter elements or cartridges therefrom by compacting the media into the bowls or containers thereof in such a way that the processed short-length vegetable fibers constituting the principal component of the media will not stratify or migrate in use, the enclosing structures of the filter element or cartridge must be specially designed not only to withstand "ram-packing" of the filter media therein by modern, high-speed filter-element packing equipment, but also they must be so constructed and arranged as to accomplish positive separation of the inlet and outlet portions of the final filter elements.

Accordingly, it is a major object of the present invention to provide a filter element or cartridge of a design and construction suited to a filtering media in the form of chemically treated, short-length vegetable fibers, either alone or incorporating a filler media such as wood chips, grain (rice) hulls, and the like, for use in applications requiring a filter element of rigid form and construction.

More particularly, the invention contemplates a filter element shell or bowl structure capable of being packed under great pressure with a filtering media characterized as aforesaid by automatic or semi-automatic ram-packing techniques and whose construction is further such as to positively prevent migration of the packed fibers or particles from the outlet to the inlet portions of said structure.

Another object of the invention is the provision of an oil filter element or cartridge characterized by simple yet highly effective design, which is relatively inexpensive in its construction and which is efficient and thoroughly dependable in use.

Other objects and features of advantage of an oil filter element or cartridge according to the present invention will appear from the following detailed description thereof, taken with the accompanying drawings illustrating a physical form thereof which has given excellent results in actual practice, in which:

FIG. 1 is a part-sectional, broken-away, side elevational view of one form of improved filter element or cartridge according to the invention; and FIG. 2 is a one-half top plan view of the structure shown in FIG. 1.

Referring to the drawings in detail, a rigid shell or container type filter element or cartridge according to the invention comprises a center-tube assembly consisting of a perforated steel center tube 10 wrapped externally for its full length with an inner wrapping of muslin or non-woven material 11 and an outer wrapping of knit cotton tubing 12, said wrappings being secured in place on said center tube by steel ferrules 13 (the upper one of which is shown) whose cylindrical bodies have internal diameter such as to enable same to be snugly fitted over the ends of the center tube and its wrappings and which are further provided at their outer ends with radially inward flanges 13a which bear tight on the top edges of the center tube and extend an appreciable distance into the bore thereof, thereby to provide flat annular seating surfaces, which latter terminate inwardly in short-length axially inward flanges 13b formed as by curling the inner edges of said radial flanges axially inwardly; a perforated cylindrical can body 15 fashioned from stiff steel sheet or fiber of substantially greater diameter than and approximately the same axial length of the center tube and having a liner 16 of muslin or non-woven material on its inner face; plated steel top and bottom end caps 17, 18, respectively, which are secured along their outer peripheral edges to the top and bottom edges respectively of the can body 15 by standard sanitary can seams designated 20; and steel cap-retaining bushings 21, 22, which clampingly secure the end caps 17, 18 along the inner edges of their aligned center openings tight against the aforesaid radial-inward flanges 13a of the ferrules 13, it being also observed that the tubular body portions of said retaining bushings have external diameter such that they must be driven into and thereby fit tight against the inner-edge axial flanges 13b of said ferrules 13; and a mass of the aforesaid improved filtering media indicated by reference numeral 24 consisting of chemically treated cotton linters or like fibers compacted into the annular space between the center tube assembly and the can body inner lining 16.

A filter element or cartridge constructed as aforesaid may be simply fabricated as follows: The said tube assembly consisting of perforated steel center 10, its outer wrappings 11, 12, and wrapping-securing ferrules 13 are put together as a subassembly unit, and next the can body 15, with one end cap 18 (the bottom one) assembled to it by the cam seam 20 and its inner liner 16 in place, is assembled to the center tube assembly as aforesaid by forcible insertion of the bottom retaining bushing 22 into the center tube, thus to secure the inner edge of the bottom cap to the bottom edge of the center tube just as the top end cap 17 is shown to be secured to the center tube, although it will be understood that at this stage of fabrication said top cap is still to be assembled. The filtering media 24 is then ram-packed through the upper open end of the can body 15 into the annular space between the center-tube wrappings and the can body inner liner, to a degree such that it completely fills said inner space and forms a semi-rigid body of the fibers compacted to the desired density. Next, the top end cap 17 is assembled to the can body by applying the seam 20 between said end cap and body, and, finally, the top cap retaining bushing 21 is driven into place to clampingly secure the top cap along the edge of its center opening against the radial-inward flange 13a of the top ferrule 13 and thereby to the top edge of the center tube 10 as shown.

When so finally assembled, the filter element or cartridge positively prevents filtering-media migration from the inlet to the outlet side or portion of the filter element. To assist in handling the finished filter element or cartridge in use, one or two bail handles 25 may be secured to the top end cap 17 in any approved manner, as by punched-up securing eyes 26.

Without further analysis, it will be appreciated that a rigid filter element described in the foregoing are characterized not only by good design but also by simple, relatively inexpensive and thoroughly dependable construction, all with a view of accomplishing positive trapping and immobilization of the filtering media contained within the can body in use of the filter element, and further of making possible the ram-packing of the shell or bowl thereof with filtering media in the form of short-fibered vegetable material alone or with added filler materials such as wood chips, rice hulls, etc. through the use of modern, high-speed, automatic or semi-automatic filter element packing equipment, and thus the invention contributes to a substantial degree in making the use of such filtering material both very practical and highly economical.

As many changes could be made in carrying out the above constructions without departing from the scope of the invention, it is intended that all matter contained in the above description or shown in the accompanying drawings shall be interpreted as illustrative and not in a limiting sense.

We claim:

1. An oil filter element or cartridge employing chemically treated, short-length vegetable fibers as the filtering media comprising: a perforated, rigid can-body type container, a perforated rigid center tube coaxial therewith, end caps each having a center opening of diameter corresponding generally to that of the center tube and being seamed along their outer peripheries to the end edges of the container body, a densely compacted mass of said vegetable fibers contained in and filling the annular space between the center tube and container body, and means for securing the end caps along their respective center openings to the ends of the center tube and in manner as positively to prevent migration of said vegetable fibers from the interior of the container body over the center-tube ends and thence outwardly through the center tube, said means comprising cylindrical ferrules affixed to the center tube ends externally thereof and having radially inward flanges extending over and bearing on the tube ends and defining flat, annular seating surfaces which terminate inwardly in cylindrical flanges which project axially into the bore of the center tube, and retaining bushings having cylindrical bodies extending into and dimensioned so as to have force fit in the openings of said ferrules defined by their cylindrical flanges and being provided on their relatively axially-outer ends with radially outward flanges which bear on and clamp the ends caps along the edges of their center openings against the annular seating surfaces defined by the radially inward flanges of said ferrules as aforesaid.

2. An oil filter element according to claim 1, wherein said center tube is provided with at least one external wrapping of material capable of preventing migration of said vegetable fibers through the perforations of the tube, and said ferrules secure the ends of the wrapping to the center tube.

3. An oil filter element according to claim 1, wherein the radially inward flanges of the cylindrical ferrules extend an appreciable distance radially into the bore of the center tube, whereby the annular seating surfaces defined thereby have substantial radial width, and wherein the radially outward flanges of the retaining bushings have corresponding radial width.

References Cited in the file of this patent

UNITED STATES PATENTS

| | | |
|---|---|---|
| 2,196,821 | Arnold | Apr. 9, 1940 |
| 2,354,481 | Russell | July 25, 1944 |
| 2,381,141 | Russell | Aug. 7, 1945 |
| 2,398,284 | Briggs | Apr. 9, 1946 |
| 2,537,897 | Hunter | Jan. 9, 1951 |
| 2,568,181 | Zimmerman | Sept. 18, 1951 |
| 2,584,771 | Wilkinson | Feb. 5, 1952 |
| 2,747,738 | Johnson | May 29, 1956 |
| 2,781,619 | Gardes | Feb. 19, 1957 |
| 2,797,811 | Wilkinson | July 2, 1957 |
| 2,855,104 | Wilkinson | Oct. 7, 1958 |